(12) United States Patent
Lanzky et al.

(10) Patent No.: US 11,540,524 B2
(45) Date of Patent: Jan. 3, 2023

(54) CUTTING APPARATUS FOR CUTTING FOOD OBJECTS

(71) Applicant: MAREL A/S, Arhus N (DK)

(72) Inventors: Thomas Norlund Lanzky, Aalborg (DK); Nelson Sabbath Vuga, Trige (DK)

(73) Assignee: MAREL A/S, Arhus N (DK)

( * ) Notice: Subject to any disclaimer, the term of this patent is extended or adjusted under 35 U.S.C. 154(b) by 100 days.

(21) Appl. No.: 16/622,624

(22) PCT Filed: Jun. 14, 2018

(86) PCT No.: PCT/EP2018/065838
§ 371 (c)(1),
(2) Date: Dec. 13, 2019

(87) PCT Pub. No.: WO2018/229206
PCT Pub. Date: Dec. 20, 2018

(65) Prior Publication Data
US 2021/0068405 A1   Mar. 11, 2021

(30) Foreign Application Priority Data

Jun. 14, 2017  (EP) ..................... 17175994

(51) Int. Cl.
*A22C 17/00*   (2006.01)

(52) U.S. Cl.
CPC ........ *A22C 17/0086* (2013.01); *A22C 17/002* (2013.01); *A22C 17/0093* (2013.01)

(58) Field of Classification Search
CPC .. Y10S 83/923; Y10S 83/932; Y10T 83/0448; Y10T 83/0462; Y10T 83/0515;
(Continued)

(56) References Cited

U.S. PATENT DOCUMENTS

| | | | |
|---|---|---|---|
| 6,407,818 B1 * | 6/2002 | Whitehouse | A22C 17/002 |
| | | | 250/559.21 |
| 6,607,082 B2 * | 8/2003 | Biagioni | B07C 5/362 |
| | | | 198/460.2 |

(Continued)

FOREIGN PATENT DOCUMENTS

| | | |
|---|---|---|
| CN | 103238913 A | 8/2013 |
| CN | 203449345 U | 2/2014 |

(Continued)

OTHER PUBLICATIONS

Search Report from corresponding CN Application No. 201880039345. 4, dated Jun. 14, 2018.

(Continued)

*Primary Examiner* — Phong H Nguyen
(74) *Attorney, Agent, or Firm* — Workman Nydegger (57) ABSTRACT

A cutting apparatus for cutting a food object where inlet and outlet conveyors are arranged in an end-to-end arrangement. A moving mechanism is provided for adjusting the relative position between the ends of the inlet and outlet conveyors, a cutting device is provided having a cutting plane extending between the inlet and outlet conveyors, a detection mechanism is provided for detecting at least one characteristics related to the food object, and a control device is provided for controlling the moving mechanism and the cutting device. Controlling the moving mechanism includes utilizing the at least one detected characteristics in determining a target width of an opening between the ends of the inlet and outlet conveyors, and controlling the cutting device includes subsequently cutting the food object into smaller food pieces. The target width of the opening is selected such that it allows smaller food pieces to fall through the opening.

24 Claims, 3 Drawing Sheets

(58) Field of Classification Search
CPC ............... Y10T 83/0519; Y10T 83/141; Y10T 83/2096; Y10T 83/2098; Y10T 83/2192; Y10T 83/2194; A22C 17/0086; A22C 17/002; A22C 17/0093; B26D 5/00; B26D 5/005; B26D 5/007; B26D 1/00; B26D 7/06; B26D 7/0625; B26D 7/18; B26D 2210/00; B26D 2210/02
See application file for complete search history.

(56) References Cited

U.S. PATENT DOCUMENTS

| | | |
|---|---|---|
| 7,861,630 B2 | 1/2011 | Sorensen et al. |
| 8,167,136 B2 | 5/2012 | Betti |
| 8,505,739 B2 | 8/2013 | Betti |
| 8,997,614 B2 | 4/2015 | Baechtle et al. |
| 9,919,445 B2 | 3/2018 | Mikkelsen et al. |
| 2007/0157776 A1* | 7/2007 | Sorensen ........... A22C 17/0086 83/23 |
| 2011/0094948 A1 | 4/2011 | Betti |
| 2012/0097502 A1 | 4/2012 | Betti |
| 2013/0205961 A1 | 8/2013 | Baechtle et al. |
| 2016/0075045 A1 | 3/2016 | Mikkelsen et al. |
| 2016/0288355 A1 | 10/2016 | Sørensen et al. |

FOREIGN PATENT DOCUMENTS

| | | |
|---|---|---|
| CN | 105246660 A | 1/2016 |
| CN | 105979784 A | 9/2016 |
| DK | 9600164 U3 | 9/1997 |
| EP | 0288592 A1 | 11/1988 |
| EP | 0288592 B1 | 8/1990 |
| EP | 2986427 A1 | 2/2016 |
| JP | S6039784 A | 3/1985 |
| JP | S6239842 U | 3/1987 |
| JP | 2007522948 A | 8/2007 |
| JP | 2011506113 A | 3/2011 |
| JP | 2016522091 A | 7/2016 |
| WO | 2009075005 A1 | 6/2009 |
| WO | 2014169925 A1 | 10/2014 |
| WO | 2015079039 A1 | 6/2015 |

OTHER PUBLICATIONS

European Search Report from EP Application No. EP17175994, dated Aug. 2, 2019.
International Search Report and Written Opinion from PCT Application No. PCT/EP2018/065838, dated Jul. 26, 2018.
Search Report from corresponding Japanese Application No. 2019-565339, dated May 24, 2022.

* cited by examiner

CUTTING APPARATUS FOR CUTTING FOOD OBJECTS

FIELD OF THE INVENTION

The present invention relates to a cutting apparatus for cutting a food object while the food object is conveyed from an inlet conveyor to an outlet conveyor, and to a method of performing the same.

BACKGROUND OF THE INVENTION

For the mechanical dividing of large pieces of meat into pieces, use is typically made of a so-called portion cutter. A portion cutter is a machine with a number of conveyor belts, a computer vision system, a knife and a control unit. Typically, there are two conveyor belts which are arranged end to end with a relatively small gap between them. The computer-controlled vision system can also be called a scanning system. The knife is typically of the "sword" type, i.e. a relatively long knife which is arranged at the side of the gap between the two conveyor belts. When a portion is to be cut from the piece of meat the meat is lying over the gap between the two conveyor belts, and the cut is carried out by the knife being rotated once at high speed, whereby the piece of meat is cut through.

Figure 1:
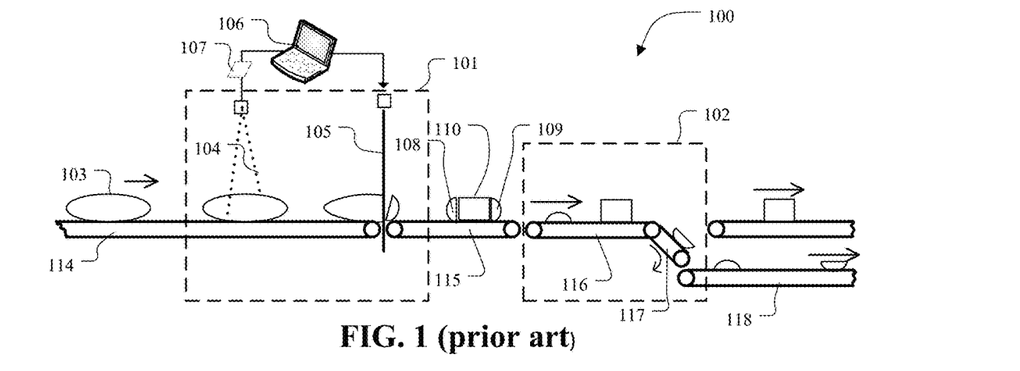
FIG. 1 shows an example of a prior art cutting apparatus.

FIG. 1 shows an example of a portion cutter 100 where a food objects 103 to be cut is transported on an inlet conveyor 114 forward to the cutting facility 101 where it is first scanned 104, for example by means of laser vision equipment. A control device 106 utilizes the resulting image data 107 in generating a three dimensional profile image that is used in instructing a knife 105 where to cut such that one or more of the smaller food pieces 108-110 fulfill certain criteria, e.g. a pre-defined target such as a weight target.

One application could be to cut the end parts of the food objects, and to automatically separate these end pieces from the central part 110, where the central part may be considered as being primary part of the food object that fulfils said target, e.g. a weight target. After cutting the food object the three parts 108-110 they typically lie tight next to each other and are received by a conveyor 115. In order to automatically separate the smaller food pieces 108-110 a device 102, sometimes referred to as Speedsort, is used. In a first step a separation is created between the end pieces and the center piece by running conveyor 116 at a higher speed than conveyor 115. In a second step the end pieces may be separated via an opening-closing conveyor 117 where the end pieces are guided on conveyor 118 resulting in two separated streams of smaller food pieces, one being the end pieces and one being the center pieces. These two streams may be utilized as infeed for two different processing steps, where one maybe a batch creation of the center pieces using multiple of robotic devices, and where one may be a secondary process such as grinding process.

This kind of a setup is however spacious due to said Speedsort where the two extra steps take place, i.e. the space creation and the creation of the two separated streams.

Another problem is that, although not shown in the example in FIG. 1, the smaller food pieces have a tendency of sticking together, in this case the end pieces may stick to the center piece meaning that such a clean separation of the end pieces and the center piece as shown here fails. A center piece with an end piece sticking to it will typically be rejected or the end piece will be manually removed from the center piece. This obviously reduces the throughput of said processing step and requires an additional labor to manually remove the end piece from the center piece.

SUMMARY OF THE INVENTION

On the above background it is an object of embodiments of the present invention to provide a cutting apparatus that requires less space and simultaneously prevents smaller food pieces from sticking together after having undergone a cutting process.

In general, the invention preferably seeks to mitigate, alleviate or eliminate one or more of the above-mentioned disadvantages of the prior art singly or in any combination. In particular, it may be seen as an object of embodiments of the present invention to provide a system that solves the above-mentioned problems, or other problems.

To better address one or more of these concerns, in a first aspect of the invention a cutting apparatus is provided for cutting a food object while the food object is conveyed from an inlet conveyor to an outlet conveyor, where the inlet and outlet conveyors are arranged in an end-to-end arrangement, the cutting apparatus comprising:

a moving mechanism for adjusting the relative position between the ends of the inlet and outlet conveyors, a cutting device having a cutting plane extending between the inlet and outlet conveyors, a detection mechanism for detecting at least one characteristics related to the food object, and a control device for controlling the moving mechanism and the cutting device, wherein controlling the moving mechanism includes utilizing the at least one detected characteristics in determining a target width of an opening between the ends of the inlet and outlet conveyors, wherein controlling of the cutting device includes subsequently cutting the food object into smaller food pieces, the target width of the opening being selected such that it allows at least one of the smaller food pieces to fall through the opening.

Assuming that only one of the smaller food pieces is dropped through the opening at a time, which would be the most common scenario, and assuming that said one of the smaller food pieces that is dropped through the opening is the front and/or the end piece of the food object, the utilization of the at least one detected characteristics preferably involves deciding on said target width such that the front and/or the end piece falls there through. The step of detecting at least one characteristics related to the food object may as an example include detecting a two or three dimensional profile data of the food object where the utilization of this two or three dimensional profile is used for determining the thickness of said front part. This thickness may vary greatly between successive food objects and therefore said target width needed to ensure that the front part falls there through. Accordingly, by dynamically adjusting the width of the opening in such a way it is ensured that the time needed to e.g. adjust the end(s) of the conveyors back to the end-to-end arrangement closing position is minimized. A receiving conveyor may, as an example, be positioned below the conveyors for receiving said at least one of the smaller food pieces falling through the opening. Said smaller food piece should of course not be construed as being limited to a front piece, but it could just as well include the back end piece, or any piece between the front end and the back end, or a combination thereof.

Also, the cutting apparatus is more compact since there is no need to include the means for generating a spacing between the smaller food pieces (e.g. via end-to-end arranged conveyors where the relative speed difference between the conveyors separates the smaller food pieces from each other) and a subsequent separation of the spaced apart smaller pieces when creating two separated streams of smaller food pieces.

More importantly, by the fact that said at least one of the smaller food pieces immediately after the cut falls through the opening, it is ensured that adjacent smaller food pieces will not stick together and therefore the throughput of one or more subsequent processing steps will be increased since no reject will be needed (and/or no manually labor to manually separating said adjacent smaller food pieces is needed). In one embodiment, said step of utilizing the at least one detected characteristics comprises determining the length of the at least one smaller food piece, where in case the length of the at least one smaller food piece exceeds a predetermined length, the controlling by the control device further includes:

instructing the moving mechanism to move the end of the outlet conveyor when the food object enters the outlet conveyor such that the end of the outlet conveyor moves with and supports the end of the food object, where upon reaching said target width, instructing the cutting device to cut the food object into said smaller food piece.

Due to the support, the cut will be better where in the absence of such a support the smaller food piece prior to the cut would otherwise partly be hanging down and therefore the cut would not be as planned, e.g. be askew instead of being vertical and straight.

In one embodiment, the controlling further comprises adjusting the speed of the outlet conveyor such that the relative speed of the portion of the food object resting on the outlet conveyor and the portion resting on the inlet conveyor is essentially the same. It is thus ensured that, while providing said support for the food object, the food object will neither be pulled nor be wrinkled because said relative speed difference will be zero.

In one embodiment, the detection mechanism is selected from one or more of the following:
an image detection device and where said at least one characteristics related to the food object is selected from one or more of the following:
 a position of the food object,
 a two dimensional surface profile of the food object,
 a three dimensional profile of the food object,
an X-ray device and where said at least one characteristics related to the food object comprises X-ray data of the food object.

In one embodiment, the cutting device is mounted to an angular adjustment mechanism configured to adjust the angle of the cut from being different from 90° in relation to a conveying direction to the food item. The flexibility of the cutting apparatus is thus increased where now the cutting angle may be changed from being a vertical cut to an angular cut, e.g. any angle different from 90°, which may be for various reasons such as for improving the appearance of the cut to make it more natural.

In one embodiment, the moving mechanism is further configured to, in response to adjusting the angle from being different from 90°, adjust the relative height position of the inlet and outlet conveyors from being in plane position to be non-in plane during the cutting. Accordingly, when adjusting the cutting angle from e.g. 90° to e.g. 60°, the vertical position of the outlet conveyor will be slightly lowered and even the horizontal position may be slightly adjusted during cutting so as to minimize said target width and to ensure that the time needed to move the inlet and outlet conveyors back to e.g. an original position where they are in an end-to-end position is minimized.

In one embodiment, the control device is further configured to instruct the cutting device to cut the food object into smaller food piece while remaining the ends of the inlet and outlet conveyors in an adjacent position so as to generate a stream of cut pieces being conveyed by the outlet conveyor. The flexibility of the cutting apparatus is thus further increased since it is possible to create two separate streams of smaller food pieces meaning that throughput for subsequent processing, e.g. batching process, may be increased. As an example, the food object may be a large food piece such as a loin, where the ends of the loin may be the smaller food pieces that are dropped on e.g. an underlying conveyor. During operation, the front part the front part is dropped on e.g. an underlying conveyor, then the inlet and outlet conveyors are moved to an end-to-end position where the food object is cut into smaller food pieces fulfilling e.g. a fixed target weight or thickness target. This stream of the smaller food pieces may be considered as being a primary stream. This is continued until the last cut, where the reaming end part is released, e.g. via movement of the inlet conveyor end. The smaller end pieces may accordingly define a sequence of secondary stream that is to be used for another processing.

The control device may be configured to operate the cutting device and the moving mechanism based on a delay identifier which specifies a maximum delay time between the time where a cutting takes place and a time where the relative position between the ends of the inlet and outlet conveyors has reached said target width. The delay identifier could be adjustable, or statically defined, and it may e.g. define that the target width should be reached immediately or shortly after the cutting. This will allow the food items to be supported almost constantly on the conveyors and it may optimize the quality.

According to a second aspect of the invention, a method is provided of cutting a food object while the food object is conveyed from an inlet conveyor to an outlet conveyor, where the inlet and outlet conveyors are arranged in an end-to-end arrangement by a cutting apparatus which comprises:
a moving mechanism for adjusting the relative position between the ends of the inlet and outlet conveyors,
a cutting device having a cutting plane extending between the inlet and outlet conveyors,
a detection mechanism for detecting at least one characteristics related to the food object, and
where the method comprises:
utilizing the at least one detected characteristics in determining a target width of an opening between the ends of the inlet and outlet conveyors, and
cutting, by the cutting device, the food object into smaller food pieces, the target width of the opening being selected such that it allows at least one of the smaller food pieces to fall through the opening.

A simple and compact solution is thus provided allowing cutting and simultaneous release of the smaller food pieces to a receiving area, e.g. an underlying take-away conveyor or a tray/box and the like. Said at least one smaller food piece may e.g. be products for a secondary processing, e.g. chicken nuggets, whereas the remaining part of the product received by the outlet conveyor may be the remaining part of the product. In one embodiment, this may be due to that the incoming food object does not fit into a subsequent batching process because it is too heavy, whereby cutting a part of the food object the remaining part of the food object fits into the distribution needed to e.g. minimize the overweight in the subsequent batching process, or it may have a more favorable appearance.

Said at least one smaller food pieces allowed to fall through the opening may in some applications be considered as a reject and where said release through the opening may be considered as a reject facility.

In one embodiment, said at least one detected characteristics comprises detecting a two or three dimensional profile of the food object. The two or three dimension profile may in one embodiment be used in determining a cutting pattern of the food object, where the utilization of this two or three dimensional profile may be determining the thickness of said at least one smaller piece.

In one embodiment, the smaller food pieces are selected from one or more of the following:
a trim piece at a front or a rear end of the food object or there between,
a food portion fulfilling at least one target selected from one or more of weight target or thickness target.

In one embodiment, said step of utilizing the at least one detected characteristics comprises:
determining the length of the at least one smaller food piece, where in case the length of the smaller food piece exceeds a pre-determined length,
instructing the moving mechanism to move the end of the outlet conveyor when the food object enters the outlet conveyor such that the end of the outlet conveyor moves with and supports the end of the food object, where upon reaching said target width, and
cutting the food object into said smaller food pieces.

In one embodiment, said step of adjusting the relative position between the ends of the inlet and outlet conveyors comprises one or more of the following:
adjusting the end of the outlet conveyor while remaining the end of the inlet conveyor fixed,
adjusting the end of the inlet conveyor while remaining the end of the outlet conveyor fixed, or
simultaneously adjusting the ends of the inlet and outlet conveyors.

The flexibility of the cutting apparatus is thus increased since all said moving combinations are possible. As an example, a scenario where it would be of advantage of moving both the inlet and outlet ends is to reduce the time until the ends are back in the end-to-end position, where instead moving only the end of the outlet conveyor, the end of the inlet conveyor is moved towards the end of the outlet conveyor, followed by a subsequent movement in the end-to-end position to a cutting position. This is in particular relevant where the smaller food piece is a food piece that exceeds said pre-determined length. After cut where this smaller food piece fall through the opening it may be of importance to reduce the time of moving the outlet end back to an end-to-end position, especially if incoming food objects are close to each other. A situation could occur where the subsequent food object is at the outlet end and has already started to exceed the end. By moving the end of the inlet conveyor towards the end of the outlet conveyor towards the end-to-end position, and subsequently move towards the cutting position (where the cutting place is between the conveyors), said situation is avoided.

In one embodiment, said step of cutting the food object into smaller food pieces, and said adjustment of said relative position between the ends of the inlet and outlet conveyors, is operated such that immediate after said cutting the relative position between the ends of the inlet and outlet conveyors has reached said target width. It is thus possible to support the food object as much as possible via said inlet/outlet ends of the conveyors such that the quality of the cut will be maximized. As an example, if a thickness of a smaller food object is 20 mm, the operation between the moving mechanism and the cutting device is such that after the knife has passed through the food object relative position between the ends of the inlet and outlet conveyors has reached it's target width, e.g. 20 mm (or around 20 mm) meaning that the impact from the knife ensures that the cut piece will fall through the opening.

In one embodiment, said step of detecting at least one characteristics related to the food object comprises determining the thickness of the at least one smaller food item, and where the target width is selected bases on that. As an example, if the thickness is determined to be 20 mm, the target width may be 20 mm or less than 20 mm, depending on the type of food object. If as an example the food object is fresh poultry fillet, it may e.g. be enough to have the target with 17 mm, i.e. such that it allows the smaller piece to fall through the opening.

Another example is when e.g. cutting a piece of thickness x mm, the opening may be y mm where y<x, and when the actual reject takes place, the opening may be opened further to z mm where z may be z≥x.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which
FIGS. 5a-c depict an embodiment from what is illustrated in FIGS. 4a-c,
FIGS. 6a-c depict yet another scenario of the cutting apparatus in FIG. 2,
FIGS. 7a,b depict an embodiment of a cutting apparatus according to the present invention, in the absence of the housing surrounding such a cutting apparatus and in the absence of the conveyor belt on the inlet and the outlet conveyors,
FIGS. 8a,b show the moving mechanism in the embodiment of FIGS. 7a,b in more detail, and
FIGS. 9a,b illustrate graphically the principle of how an opening/closing between the inlet and the outlet conveyors may be performed while remaining that belt tension fixed.

DESCRIPTION OF EMBODIMENTS

Figure 2:
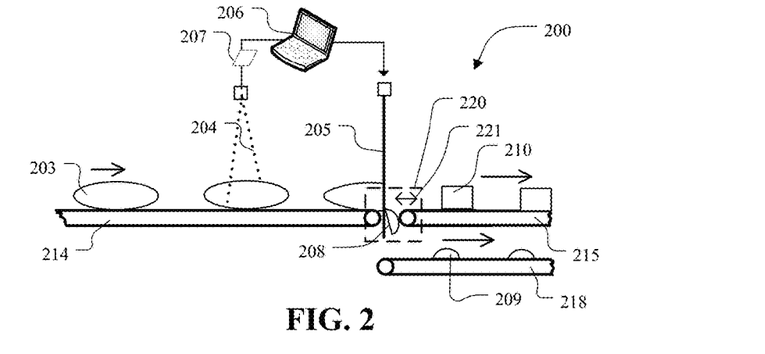
FIG. 2 shows one embodiment of a cutting apparatus according to the present invention.

FIG. 2 depicts on embodiment of a cutting apparatus 200 according to the present invention for cutting a food object 203 while the food object is conveyed from an inlet conveyor 214 to an outlet conveyor 215, where the inlet and outlet conveyors are arranged in an end-to-end arrangement. The cutting apparatus 200 comprises a moving mechanism 220 for adjusting the relative position between the ends of the inlet and outlet conveyors as indicated by arrow 221 from a closing position to an open position and vice versa, from open position to a closing position or any retracted position.

The cutting apparatus further comprises a cutting device 205 having a cutting plane extending between the inlet and outlet conveyors 214, 215, a detection mechanism 204 for detecting at least one characteristics related to the food object, and a control device 206 for controlling the moving mechanism and the cutting device in response to an output signal from the detection mechanism 204. As will be discussed in more details later, the controlling of the moving mechanism includes utilizing the at least one detected characteristics in determining a target width of an opening between the ends of the inlet and outlet conveyors. In the embodiment shown here, a laser line scanner and a camera may be used where the camera is configured to detect reflected light from the outer surface of the food object and based thereon generates a three dimensional profile image. Any other type of detection mechanism know to a person skilled in the art may be implemented, e.g. X-ray and the like.

The controlling of the cutting device further includes subsequently cutting the food object into smaller food pieces 208, where the target width of the opening is selected such that it allows at least one of the smaller food pieces to fall through the opening. The target width is preferably the minimum width needed to allow said at least one 208 of the smaller food pieces to fall through the opening between the ends of the inlet and outlet conveyors meaning that for thinner pieces the width of the opening is less than for thicker smaller pieces.

Referring to the example shown here, a front part 208 is cut and immediately it is allowed to be dropped via gravity and/or knife inertia on e.g. an underlying take-away conveyor 218, that receives it (should not be limited to only end parts) and conveys it to e.g. a subsequent process. After the cut, the ends of the inlet and outlet conveyors are moved to a closing position, where e.g. a subsequent cutting process takes place and where the resulting smaller food pieces 210 are conveyed by the outlet conveyor 215 to e.g. a subsequent process, which could be a batching process. The same process may be repeated for the end part, or any part between the ends of the food object.

Figure 3A:
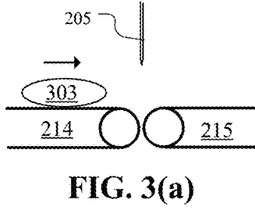
FIGS. 3a-c show one embodiment of how to create a temporal opening between ends of inlet and outlet conveyors.
Figure 3B:
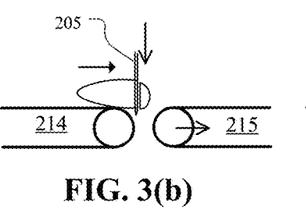
Figure 3C:
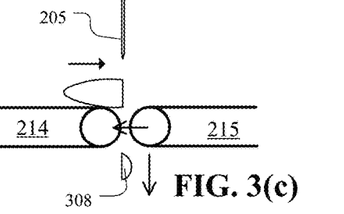

FIG. 3a-c shows one embodiment of how to create said temporal opening between said ends of the inlet and outlet conveyors 214, 215, where the end of the inlet conveyor 214 is kept fixed while the end of the outlet conveyor is moved to an open position by said moving mechanism as shown in FIG. 3b followed by a subsequent cutting, resulting in that the end part falls freely through the opening as shown in FIG. 3c, followed by a subsequent movement of the outlet end back to the closing position (or retracted position).

Figure 4A:
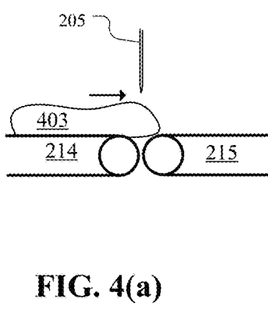
FIGS. 4a-c show a scenario where based on e.g. a three dimensional profile image of food object, the smaller food piece may be released through the opening.
Figure 4B:
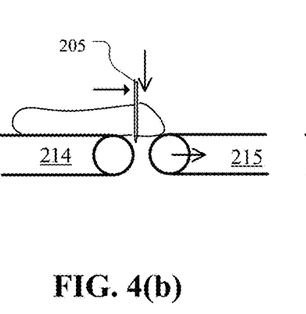
Figure 4C:
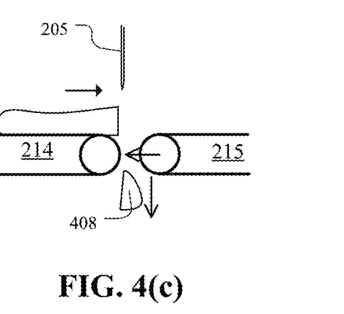

FIG. 4a-c shows a scenario where based on e.g. said three dimensional profile image of the food object 303, the smaller food piece to be released (in this example the front piece) through the opening exceeds a pre-determined length. In such a scenario, the control device instructs the moving mechanism to move the end of the outlet conveyor when the food object 403 enters the outlet conveyor as shown in FIGS. 4a,b such that the end of the outlet conveyor moves with and supports the end of the food object. Upon reaching said target width the front piece 408 is cut where it falls freely through the opening, followed by a subsequent movement back to the closing position as shown in FIG. 4c.

Figure 5A:
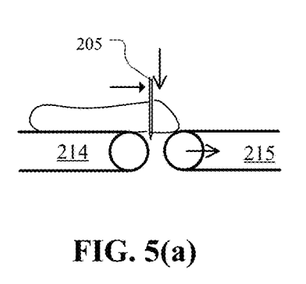
Figure 5B:
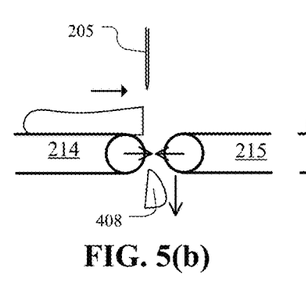
Figure 5C:
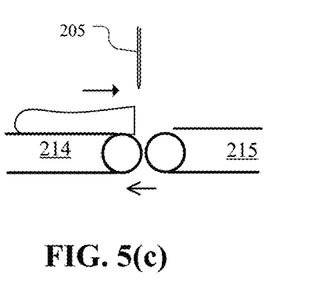

FIGS. 5a-c depict an embodiment from what is illustrated in FIGS. 4a-c, except where the end of the inlet conveyor additionally moves towards and end of the outlet conveyor so as to reduce the time until the ends are in closing position. Subsequently, the ends in the closing position are both moved to the cutting position as shown in FIG. 5c while preserving the closing position.

Figure 6A:
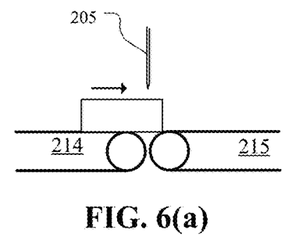
Figure 6B:
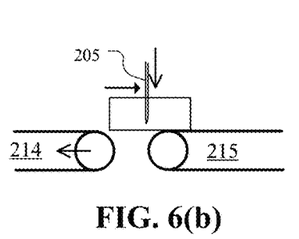
Figure 6C:
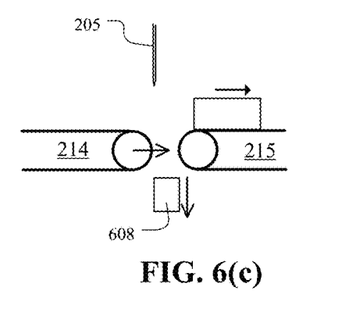

FIGS. 6a-c depict yet another scenario of the cutting apparatus in FIG. 2 where the end of the inlet conveyor 214 is moved as indicated by the arrow in FIG. 6b followed by a cut, and where the inlet end then moves back to the closing position as shown in FIG. 6c.

Figure 7A:
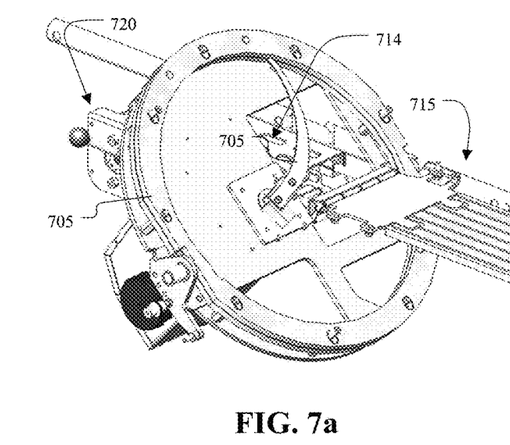
Figure 7B:
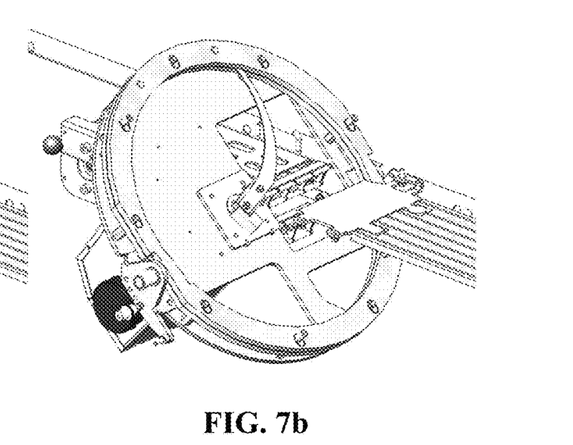

FIG. 7a,b depicts an embodiment of a cutting apparatus according to the present invention, in the absence of the housing surrounding such a cutting apparatus and in the absence of the conveyor belt on the inlet and the outlet conveyors 714, 715, where in the embodiment the end of the outlet conveyor 715 is attached to a moving mechanism 720 that moves the end of the outlet conveyor from the closing position shown in FIG. 7a to the open position shown in FIG. 7b, and vice versa. The cutting device shown here is sword" type and is rotatable mounted to a frame 705.

Figures 8A, 8B:
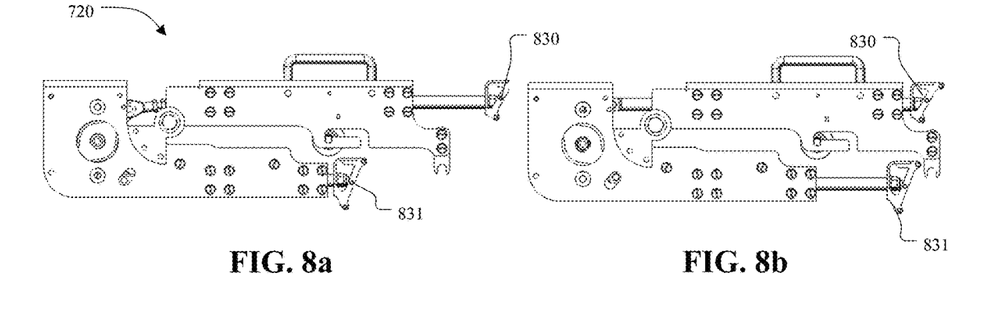

FIG. 8a,b shows the moving mechanism in the embodiment of FIGS. 7a,b where arms 830, 831 are connected to an upper part or upper roller of the end of the outlet conveyor, and a lower part or lower roller of the end of the conveyor, respectively, where via synchronized movement of the arms in opposite direction the tension of the conveyor belt is remained fixed and said opening/closing between the ends may be fully controlled. The arms 830, 831 may be connected to an electrical motor (not shown) to operate accurately and in a controlled way the movement of the arms.

Figure 9A:
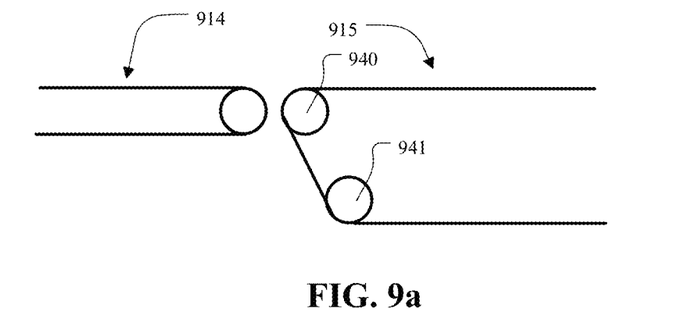
Figure 9B:
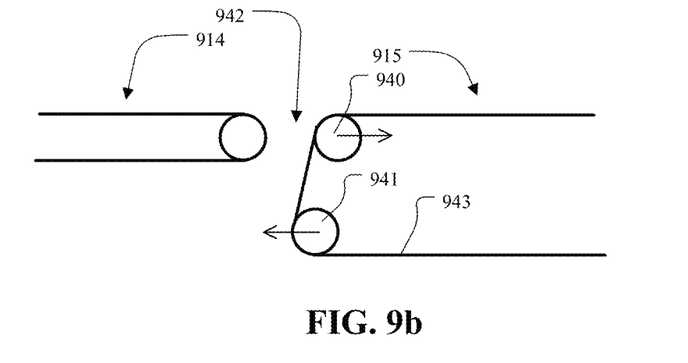

FIG. 9a,b illustrate graphically the principle where arm 830 may be attached to the upper roller 940 and arm 831 to the lower roller 941, where via the opposite pulling/pushing forces as indicated by the horizontal arrows said opening 942 and closing may be achieved while at the same time remaining the belt tension fixed.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A cutting apparatus for cutting a food object while the food object is conveyed from an inlet conveyor to an outlet conveyor, where the inlet and outlet conveyors are arranged in an end-to-end arrangement, the cutting apparatus comprising:
   a moving mechanism for adjusting a relative position between the ends of the inlet and outlet conveyors,
   a cutting device having a cutting plane extending between the inlet and outlet conveyors,
   a detection mechanism for detecting at least one characteristics related to the food object, and
   a control device for controlling the moving mechanism and the cutting device, wherein controlling the moving mechanism includes utilizing the at least one detected characteristics in determining a target width of an opening between the ends of the inlet and outlet conveyors, wherein controlling of the cutting device includes subsequently cutting the food object into smaller food pieces, the target width of the opening being selected such that it allows at least one of the smaller food pieces to fall through the opening, wherein the end of at least one of the inlet and outlet conveyors is arranged to dynamically move relative to one another to adjust the target width according to a size or dimension of one of the smaller food pieces;

wherein the target width is a minimum width required to allow said at least one of the smaller food pieces to fall through the opening between the ends of the inlet and outlet conveyors.

2. The cutting apparatus according to claim 1, where one of the smaller food pieces is dropped through the opening.

3. The cutting apparatus according to claim 2, wherein said one of the smaller food pieces that is dropped through the opening is a front and/or an end piece of the food object.

4. The cutting apparatus according to claim 1, wherein utilizing the at least one detected characteristics comprises determining a length of the at least one smaller food piece, where in case the length of the smaller food piece exceeds a pre-determined length, the controlling by the control device further includes:

instructing the moving mechanism to move the end of the outlet conveyor when the food object enters the outlet conveyor such that the end of the outlet conveyor moves with and supports the end of the food object, where upon reaching said target width, instructing the cutting device to cut the food object into said smaller food piece.

5. The cutting apparatus according to claim 4, wherein the controlling further comprises adjusting a speed of the outlet conveyor such that a relative speed of a portion of the food object resting on the outlet conveyor and a portion resting on the inlet conveyor is essentially the same.

6. The cutting apparatus according to claim 1, wherein the detection mechanism is selected from one or more of the following:

an image detection device and where said at least one characteristics related to the food object is selected from one or more of the following:

a position of the food object, a two dimensional surface profile of the food object, a three dimensional profile of the food object, an X-ray device and where said at least one characteristics related to the food object comprises X-ray data of the food object.

7. The cutting apparatus according to claim 1, wherein the cutting device is mounted to an angular adjustment mechanism configured to adjust an angle a of the cut from being different from 90° in relation to a conveying direction to the food object.

8. The cutting apparatus according to claim 7, wherein the moving mechanism is further configured to, in response to adjusting the angle a from being different from 90°, adjust a relative height position of the inlet and outlet conveyors from being in plane position to be non-in plane during the cutting.

9. The cutting apparatus according to claim 1, wherein the control device is further configured to instruct the cutting device to cut the food object into cut smaller food piece while remaining the ends of the inlet and outlet conveyors in an adjacent position so as to generate a stream of cut pieces being conveyed by the outlet conveyor.

10. The cutting apparatus according to claim 1, wherein the control device is further configured to operate the cutting device and the moving mechanism based on a delay identifier which specifies a maximum delay time between the time where a cutting takes place and a time where a relative position between the ends of the inlet and outlet conveyors has reached said target width.

11. The cutting apparatus according to claim 1, further comprising a receiving conveyor positioned below the inlet and outlet conveyors spanning the target width for receiving said at least one of the smaller food pieces falling through the opening.

12. The cutting apparatus according to claim 1, the at least one characteristic related to the food object is at least a two dimensional profile of the food object arranged for determining a thickness of the food object.

13. The cutting apparatus according to claim 1, wherein said dynamic movement of the end of at least one of the inlet and outlet conveyors to adjust the target width is carried out to reach the target width immediately after said cutting.

14. The cutting apparatus according to claim 1, wherein the cutting device is a knife and an impact from the knife is arranged to make the smaller food pieces fall through the opening.

15. The cutting apparatus according to claim 1, wherein the detecting at least one characteristic related to the food object comprises determining the thickness of the at least one smaller food item, and wherein the target width is selected based on said thickness.

16. The cutting apparatus according to claim 1, wherein the target width is less than the thickness of the smaller food pieces.

17. A method of cutting a food object while the food object is conveyed from an inlet conveyor to an outlet conveyor, where the inlet and outlet conveyors are arranged in an end-to-end arrangement by a cutting apparatus which comprises:

a moving mechanism for adjusting a relative position between the ends of the inlet and outlet conveyors, a cutting device having a cutting plane extending between the inlet and outlet conveyors, a detection mechanism for detecting at least one characteristics related to the food object, and where the method comprises:

utilizing the at least one detected characteristics in determining a target width of an opening between the ends of the inlet and outlet conveyors, and cutting, by the cutting device, the food object into smaller food pieces, the target width of the opening being selected such that it allows at least one of the smaller food pieces to fall through the opening;

wherein the end of at least one of the inlet and outlet conveyors is arranged to dynamically move relative to one another to adjust the target width according to a size or dimension of one of the smaller food pieces;

wherein the target width is a minimum width required to allow said at least one of the smaller food pieces to fall through the opening between the ends of the inlet and outlet conveyors.

18. The method according to claim 17, wherein said at least one detected characteristics comprises detecting a two or three dimensional profile of the food object.

19. The method according to claim 18, where the two or three dimensional profile is used in determining a cutting pattern of the food object.

20. The method according to claim 17, wherein the smaller food pieces are selected from one or more of the following:
 a trim piece at a front or a rear end of the food object or there between,
 a food portion fulfilling at least one target selected from one or more of weight target or thickness target.

21. The method according to claim 17, wherein the step of utilizing the at least one detected characteristics comprises:
 determining a length of the at least one smaller food piece, where in case the length of the smaller food piece exceeds a pre-determined length,
 instructing the moving mechanism to move the end of the outlet conveyor when the food object enters the outlet conveyor such that the end of the outlet conveyor moves with and supports the end of the food object, where upon reaching said target width, and
 cutting the food object into said smaller food piece.

22. The method according to claim 17, wherein adjusting the relative position between the ends of the inlet and outlet conveyors comprises one or more of the following:
 adjusting the end of the outlet conveyor while remaining the end of the inlet conveyor fixed,
 adjusting the end of the inlet conveyor while remaining the end of the outlet conveyor fixed, or
 simultaneously adjusting the ends of the inlet and outlet conveyors.

23. The method according to claim 17, wherein said step of cutting the food object into smaller food pieces, and said adjustment of said relative position between the ends of the inlet and outlet conveyors, is operated such that the relative position between the ends of the inlet and outlet conveyors has reached said target width immediately after said cutting.

24. The method according to claim 17, further comprising the step of providing a receiving conveyor positioned below the inlet and outlet conveyors and spanning the target width for receiving said at least one of the smaller food pieces falling through the opening.

* * * * *